(12) United States Patent
Fosnight et al.

(10) Patent No.: US 12,570,473 B2
(45) Date of Patent: Mar. 10, 2026

(54) CONTAINER TO TOTE DISPENSE INTEGRATED WITH AUTOMATED STORAGE AND RETRIEVAL SYSTEM

(71) Applicant: Symbotic LLC, Wilmington, MA (US)

(72) Inventors: William J. Fosnight, Windham, NH (US); Devin Lert, Wakefield, MA (US); John G. Lert, Jr., Wakefield, MA (US); Stephanie Waite, Burlington, MA (US)

(73) Assignee: Symbotic LLC, Wilmington, MA (US)

( * ) Notice: Subject to any disclaimer, the term of this patent is extended or adjusted under 35 U.S.C. 154(b) by 884 days.

(21) Appl. No.: 17/884,345

(22) Filed: Aug. 9, 2022

(65) Prior Publication Data

US 2023/0053089 A1 Feb. 16, 2023

Related U.S. Application Data

(60) Provisional application No. 63/232,083, filed on Aug. 11, 2021.

(51) Int. Cl.
  B65G 1/137 (2006.01)
  B65G 1/04 (2006.01)

(52) U.S. Cl.
  CPC ......... B65G 1/1378 (2013.01); B65G 1/0492 (2013.01); B65G 2203/0233 (2013.01); B65G 2203/041 (2013.01)

(58) Field of Classification Search
  CPC ............... B65G 1/1378; B65G 1/0492; B65G 2203/0233; B65G 2203/041
  See application file for complete search history.

(56) References Cited

U.S. PATENT DOCUMENTS 3,703,232 A * 11/1972 Zbiegien ........... B65G 47/1478
                                                              198/383
4,330,048 A 5/1982 Joselhoff
4,687,462 A 8/1987 Rewitzer
                    (Continued)

FOREIGN PATENT DOCUMENTS

JP 2016167246 9/2016
JP 2017074974 4/2017
            (Continued)

OTHER PUBLICATIONS

English language Abstract for JP2016167246 published Sep. 15, 2016.
            (Continued)

*Primary Examiner* — Kyle O Logan
(74) *Attorney, Agent, or Firm* — Perman & Green, LLP

(57) ABSTRACT

An automated storage and retrieval facility includes a container dispenser which transfers one or more containers into a tote. Once loaded into a tote, the one or more containers may receive goods to fulfill an order. Once filled with goods, the containers may be accessed by customers for transport away from the facility. The container dispenser may include a table configured to move over an opening of a tote to dispense more than one container at different positions within the tote. The container dispenser may be integrated within a storage area of the automated storage and retrieval facility. Alternatively, the container dispenser may be part of workstation positioned away from the storage area.

25 Claims, 18 Drawing Sheets

(56)     References Cited

U.S. PATENT DOCUMENTS

| | | | | |
|---|---|---|---|---|
| 4,912,906 | A | 4/1990 | Toner | |
| 6,055,796 | A | 5/2000 | Lerner et al. | |
| 6,185,479 | B1 * | 2/2001 | Cirrone | G06Q 10/08 |
| | | | | 700/214 |
| 7,246,706 | B1 * | 7/2007 | Shakes | B07C 7/02 |
| | | | | 209/614 |
| 9,242,751 | B1 * | 1/2016 | Joplin | B07C 5/3412 |
| 11,537,976 | B2 * | 12/2022 | Gravelle | H04W 4/40 |
| 11,905,058 | B2 * | 2/2024 | Lert, Jr. | G06Q 10/08 |
| 2003/0205035 | A1 | 11/2003 | Bussey, Jr. et al. | |
| 2005/0102974 | A1 | 5/2005 | Reed | |
| 2012/0006777 | A1 | 1/2012 | Schiller | |
| 2014/0025545 | A1 * | 1/2014 | Carson | G07F 9/009 |
| | | | | 705/29 |
| 2014/0083054 | A1 * | 3/2014 | Piat | B65B 43/14 |
| | | | | 53/384.1 |
| 2015/0291296 | A1 | 10/2015 | Lorger et al. | |
| 2016/0129587 | A1 | 5/2016 | Lindbo et al. | |
| 2017/0029153 | A1 | 2/2017 | Beutler | |
| 2018/0194556 | A1 * | 7/2018 | Lert, Jr. | B65G 1/0492 |
| 2018/0253805 | A1 * | 9/2018 | Kelly | G06Q 50/12 |
| 2018/0260802 | A1 | 9/2018 | Humphrys et al. | |
| 2019/0092505 | A1 | 3/2019 | Brunschwiler | |
| 2019/0135322 | A1 | 5/2019 | Bacallao | |
| 2019/0270532 | A1 | 9/2019 | Johnson | |
| 2019/0283909 | A1 | 9/2019 | Amemura | |
| 2020/0239224 | A1 | 7/2020 | Etiz et al. | |
| 2021/0032026 | A1 * | 2/2021 | Lindbo | B65G 1/0478 |
| 2021/0292091 | A1 * | 9/2021 | Jaynes | G16H 40/63 |

FOREIGN PATENT DOCUMENTS

| | | |
|---|---|---|
| JP | 2019164539 | 9/2019 |
| WO | 9821100 | 5/1998 |
| WO | 2012123564 | 9/2012 |
| WO | 2012156451 | 11/2012 |
| WO | 2014076507 | 5/2014 |
| WO | 2017083234 | 5/2017 |
| WO | 2021066652 | 4/2021 |
| WO | 2021067196 | 4/2021 |

OTHER PUBLICATIONS

English language Abstract for JP2017074974 published Apr. 20, 2017.

English language Abstract for JP2019164539 published Sep. 26, 2019.

English language Abstract for WO2012156451 published Sep. 20, 2012.

English language Abstract for WO2012123564 published Nov. 22, 2012.

* cited by examiner

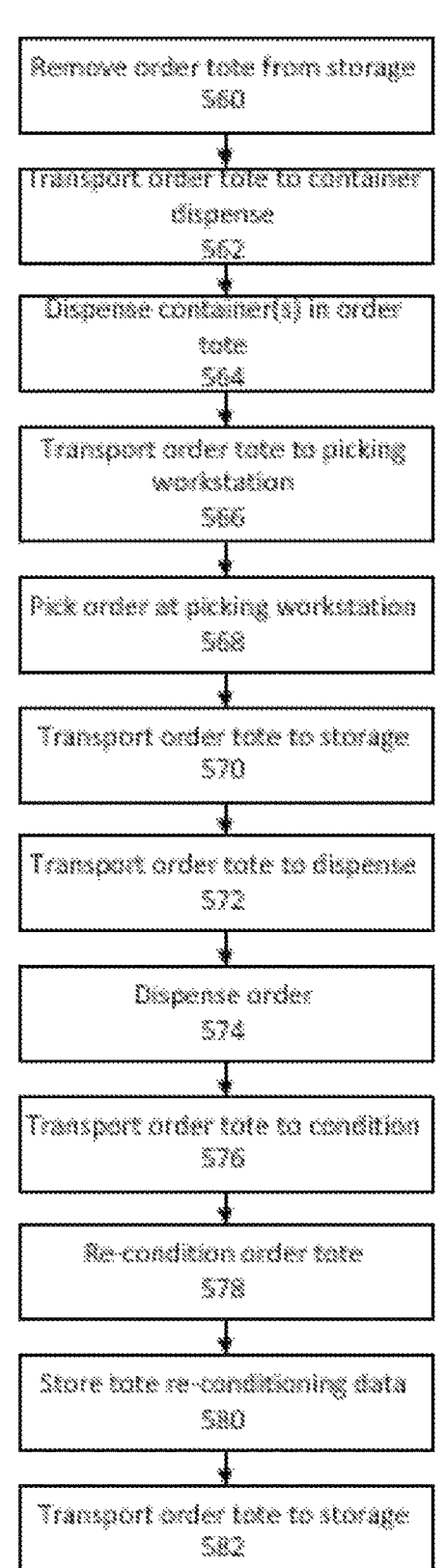

Remove order tote from storage
560

Transport order tote to container
dispense
562

Dispense container(s) in order
tote
564

Transport order tote to picking
workstation
566

Pick order at picking workstation
568

Transport order tote to storage
570

Transport order tote to dispense
572

Dispense order
574

Transport order tote to condition
576

Re-condition order tote
578

Store tote re-conditioning data
580

Transport order tote to storage
582

FIGURE 13

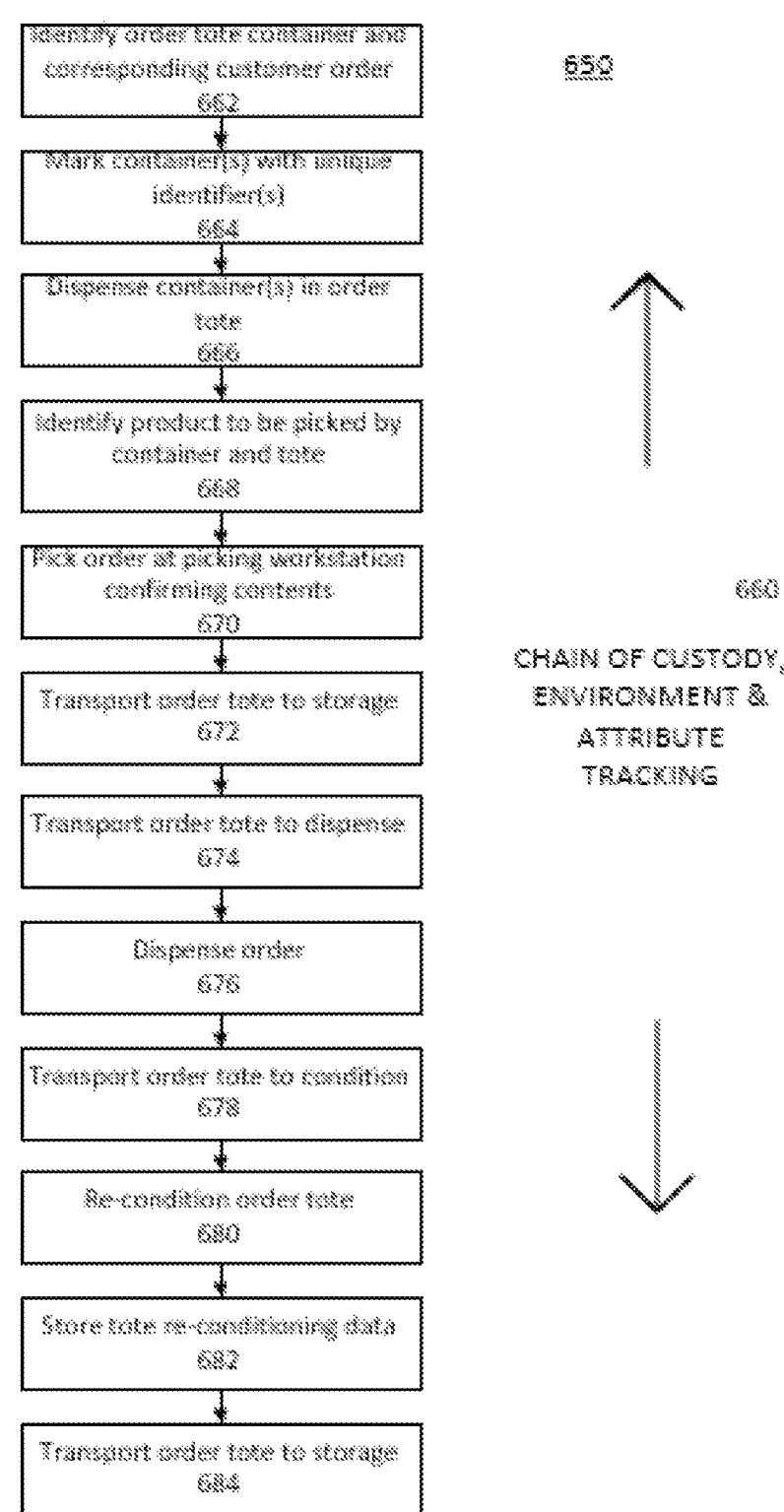

650

Identify order tote container and corresponding customer order
662

Mark container(s) with unique identifier(s)
664

Dispense container(s) in order tote
666

Identify product to be picked by container and tote
668

Pick order at picking workstation confirming contents
670

Transport order tote to storage
672

Transport order tote to dispense
674

Dispense order
676

Transport order tote to condition
678

Re-condition order tote
680

Store tote re-conditioning data
682

Transport order tote to storage
684

660

CHAIN OF CUSTODY, ENVIRONMENT & ATTRIBUTE TRACKING

FIGURE 15

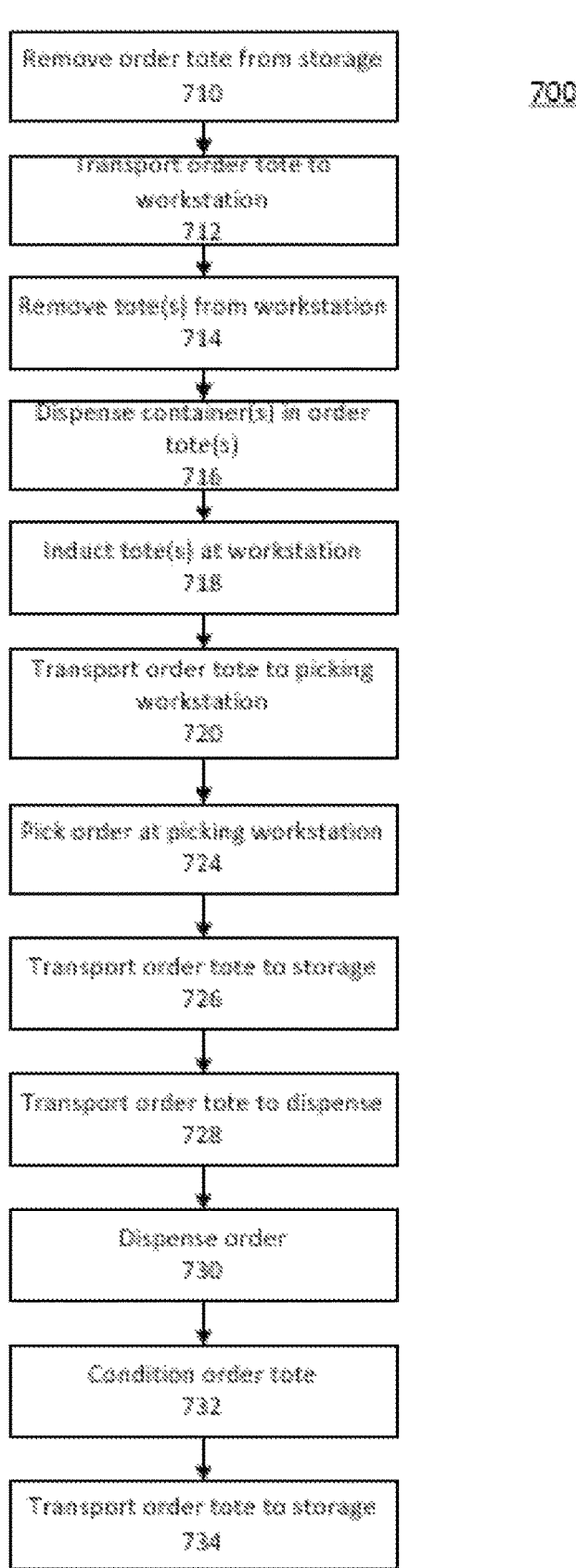

700

Remove order tote from storage
710

Transport order tote to
workstation
712

Remove tote(s) from workstation
714

Dispense container(s) in order
tote(s)
716

Induct tote(s) at workstation
718

Transport order tote to picking
workstation
720

Pick order at picking workstation
724

Transport order tote to storage
726

Transport order tote to dispense
728

Dispense order
730

Condition order tote
732

Transport order tote to storage
734

FIGURE 16

CONTAINER TO TOTE DISPENSE INTEGRATED WITH AUTOMATED STORAGE AND RETRIEVAL SYSTEM

PRIORITY DATA

The present application claims priority to U.S. Provisional Patent Application No. 63/232,083, filed on Aug. 11, 2021, entitled "CONTAINER TO TOTE DISPENSE INTEGRATED WITH AUTOMATED STORAGE AND RETRIEVAL SYSTEM", which application is incorporated by reference herein in its entirety.

BACKGROUND

An order-fulfillment system for use in supply chains, for example in retail supply chains, may fulfill orders for individual product units, referred to herein as "eaches" (also called "pieces", "inventory", "items" or, generally, any articles available for purchase in retail as a purchase unit, etc.). Eaches are conventionally packed into totes to fulfill orders. However, customers may wish to have their orders placed into containers which they can then easily transport home.

SUMMARY

The present technology, roughly described, relates to an automated storage and retrieval facility comprising a container dispenser which transfers one or more containers into a tote. Once loaded into a tote, the one or more containers may receive goods to fulfill an order. Once filled with goods, the containers may be accessed by customers for transport away from the facility. The container dispenser may include a table configured to move over an opening of a tote to dispense more than one container at different positions within the tote. The container dispenser may be integrated within a storage area of the automated storage and retrieval facility. Alternatively, the container dispenser may be part of workstation positioned away from the storage area.

In one example, the present technology relates to a container dispenser for dispensing one or more containers into a tote within an automation-based order fulfillment system, the dispense module comprising: a dispense module configured to hold the one or more containers, and configured to dispense the one or more containers into the tote; a table configured to index the dispense module to enable the dispense module to dispense the one or more containers at different positions within the tote; and a structure configured to support the table and dispense module over the tote.

In a further example, the present technology relates to an automation-based order fulfillment system comprising: a storage area comprising storage locations configured to store a plurality of totes; an interface adjacent a portion of the storage area comprising a portal through which totes of the plurality of totes may be transferred; mobile robots configured to obtain the totes from storage and position the totes at the interface; and a container dispenser configured to dispense one or more containers into the totes received from the interface, the dispense module comprising: a dispense module configured to hold the one or more containers, and configured to dispense the one or more containers into the totes, and a table configured to index the dispense module to enable the dispense module to dispense the one or more containers at different positions within the tote.

In another example, the present technology relates to an automation-based order fulfillment system comprising: a storage area comprising storage locations configured to store a plurality of totes; mobile robots configured to transfer totes to and from the storage locations of the storage area; and a container dispenser configured to receive totes from the mobile robots, and configured to transfer one or more containers into the totes received from the mobile robots, the dispense module comprising: a dispense module configured to hold the one or more containers, and configured to dispense the one or more containers into the totes, and a table configured to index the dispense module to enable the dispense module to dispense the one or more containers at different positions within the tote.

In a still further example, the present technology relates to a method of fulfilling orders in an automation-based order fulfillment system, comprising: (a) positioning an order tote for fulfilling one or more orders at a container dispenser, the container dispenser comprising containers configured to be dispensed into the order tote; (b) dispensing one or more containers into the order tote; and (c) transporting the order tote to a workstation where goods are placed into the one or more containers in the tote to fulfill one or more orders.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present technology will be described with reference to the following figures.

FIGS. 3A-3E are perspective views of a container dispenser at different steps of dispensing one or more containers into totes according to embodiments of the present technology.

FIGS. 13-18 are flowcharts including the steps for dispensing containers according to alternative embodiments of the present technology.

DETAILED DESCRIPTION

Figure 1:
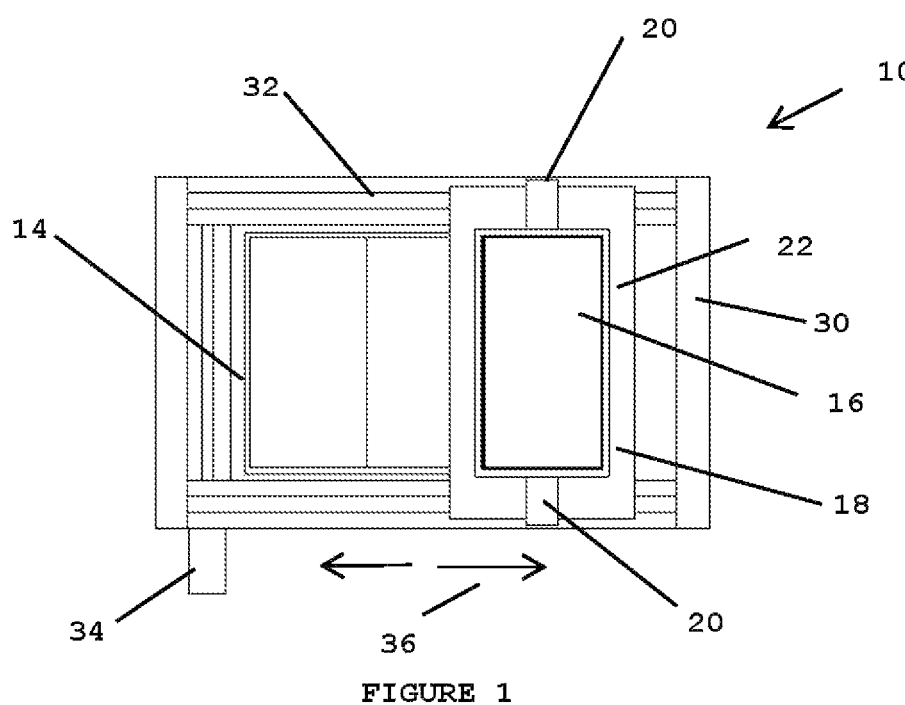
FIG. 1 is a top view of a container dispenser according to embodiments of the present technology.

Embodiments of the present technology will be described with reference to the figures, which in general relate to a container to tote dispense module integrated with an automated storage and retrieval system for use in inventory management, order fulfillment and automation-based order fulfillment. More specifically, the technology relates to various systems and methods of integrating container to tote dispense modules with an automated storage and retrieval system.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±2.5%.

For purposes of this disclosure, a connection may be a direct connection or an indirect connection (e.g., via one or more other parts). In some cases, when a first element is referred to as being connected, affixed or coupled to a second element, the first and second elements may be directly connected, affixed or coupled to each other or indirectly connected, affixed or coupled to each other. When a first element is referred to as being directly connected, affixed or coupled to a second element, then there are no intervening elements between the first and second elements (other than possibly an adhesive or melted metal used to connect, affix or couple the first and second elements).

The systems disclosed may be used in conjunction with a robotic picking system(s) and robotics, for example, as disclosed in U.S. Pat. No. 11,142,398 granted Oct. 12, 2021 and entitled "Order Fulfillment System" which is incorporated by reference herein in its entirety. Further, the systems disclosed herein may be used in conjunction with different elements of full or partially automated supply chain systems, for example, as disclosed in the following: U.S. Patent Publication No. U52021/0261335 A1 published Aug. 26, 2021 and entitled "Automated Retail Supply Chain and Inventory Management System"; U.S. Pat. No. 10,919,701 granted Feb. 16, 2021 and entitled "Interchangeable Automated Mobile Robots with a Plurality of Operating Modes Configuring a Plurality of Different Robot Task capabilities"; U.S. Pat. No. 11,315,072 granted Apr. 26, 2022 and entitled "Inventory Management System and Method" and U.S. Patent Publication No. U52018/0341908 A1 having publication date Nov. 29, 2018 and entitled "Fully Automated Self Service Store", all of which are incorporated by reference herein in their entirety.

Figure 2:
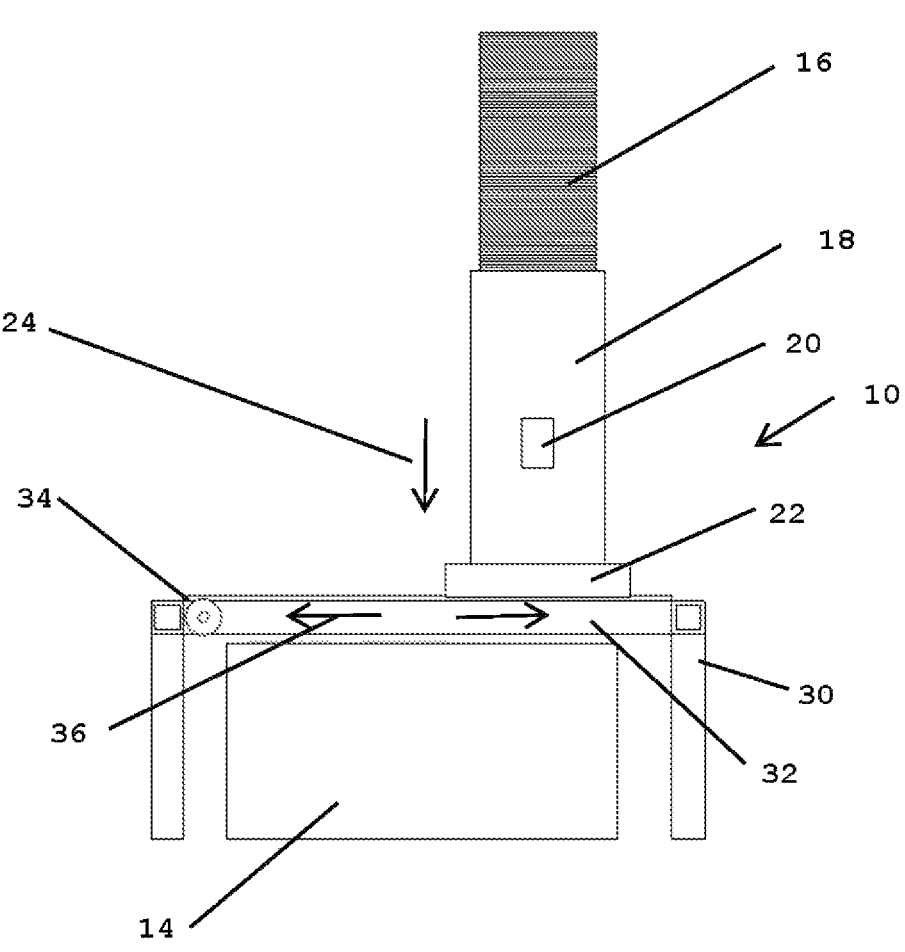
FIG. 2 is a side view of a container dispenser according to embodiments of the present technology.

Referring now to FIG. 1, there is shown a top view of a container dispenser 10. Referring also to FIG. 2, there is shown a side view of a container dispenser 10. Container dispenser 10 is configured to dispense containers 16 into tote 14. Containers 16 may be nested cardboard containers as shown. In alternate aspects, container 16 may be bags or any suitable container, formed of cardboard, plastic, metal or other materials, suitable for holding consumer products such as groceries. Container 16 may have identification features where the features may be an RFID tag or other identification feature such as Bar Code or features that may be provided to detect identification of the container. Container 16 may have identification features that are personal to the customer such as the customer's name or targeted advertising. Handles or cutouts may be provided in container 16 to allow a customer to ergonomically move container 16 from location to location. Although container 16 is shown as filling ⅓ of tote 14, container 16 may have any suitable size such as ½ tote, ¼ tote, ⅙ tote or otherwise. Containers 16 are shown as nested cardboard boxes that are dispensed, in the direction of arrow 24, by dispense module 18 into tote 14 one at a time utilizing dispense actuator 20. In one example, the dispense actuator (or other portion of the container dispenser 10) may grip and release a lip or rim of a container, or a bottom surface of the container, to dispense containers one at a time into the tote. The dispense actuator may automatically actuate to dispense a container one at a time, or it may be manually actuated to dispense a container one at a time.

A through beam sensor (not shown) may be provided to detect that the container is completely seated into tote 14. Base 22 is coupled to staging table 32 that moves the base 22 in the direction of arrow 36, and hence module 18, with respect to tote 14. Table 32 is supported by frame 30 that is grounded with tote 14 where drive motor 34 is provided to move base 22. The actuator may be coordinated with the motor so that the actuator dispenses a container when the motor positions a container at the next indexed position over the tote. Module 18 is moved in the direction of arrow 36 to further dispense containers 16 (3 per tote in the example shown) to fill tote 14 with containers 16. A camera with image processing software (not shown) may be provided, for example, for validation of inserted boxes or containers position and condition or validation of emptied boxes or containers. Generally camera inspection capability may be provided throughout the ASRS system.

Figures 3A, 3B, 3C:
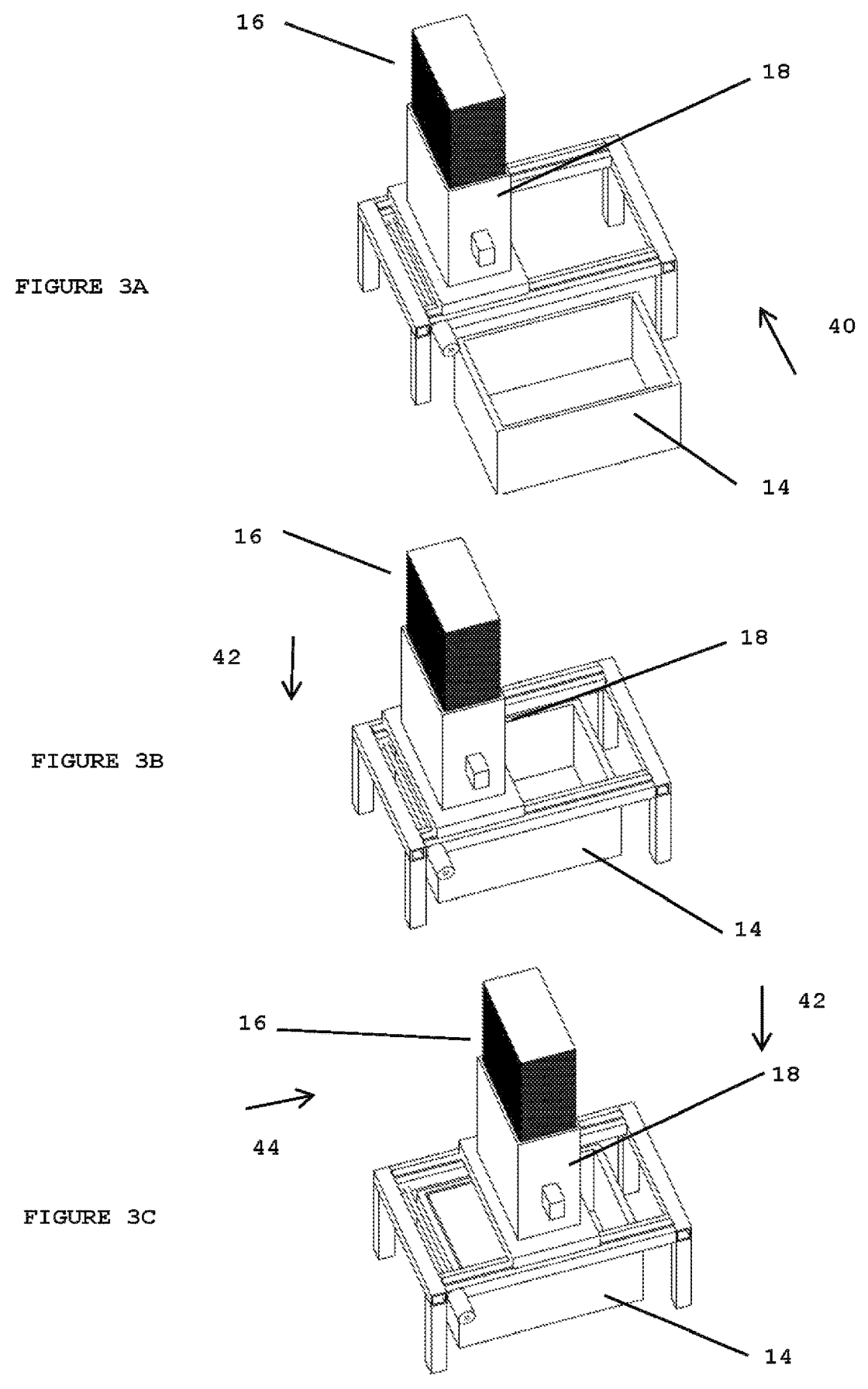
Figure 3D:
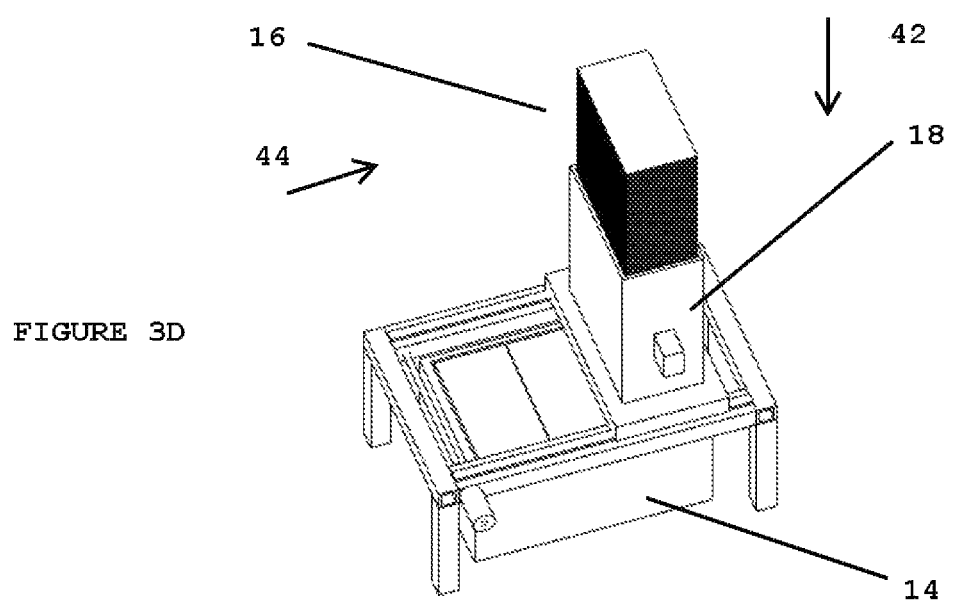
Figure 3E:
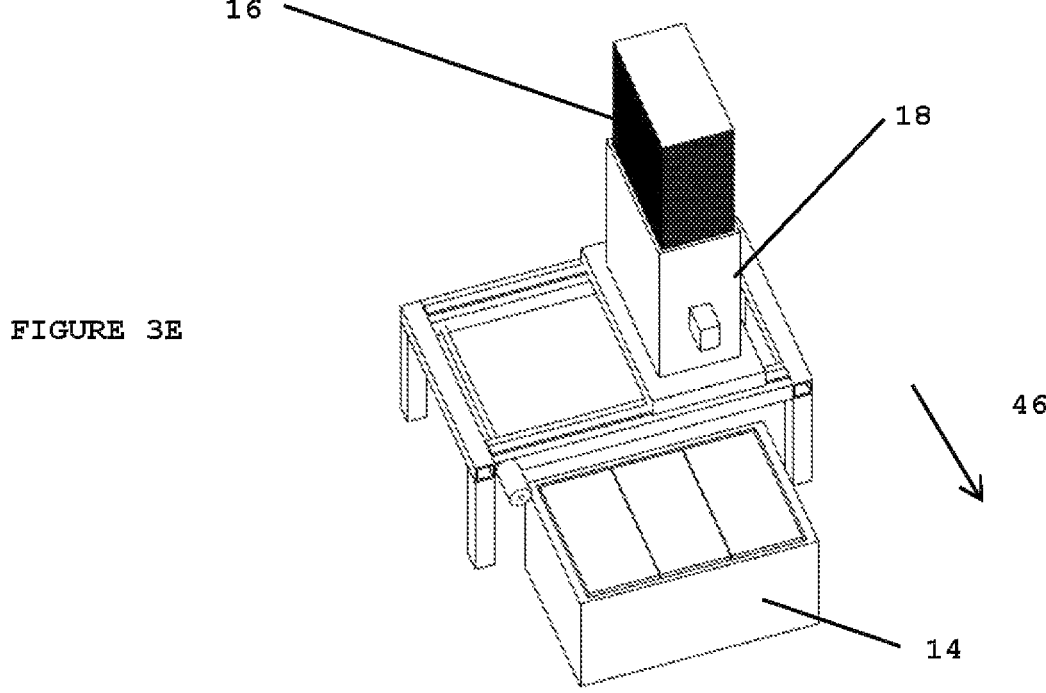

Referring now to FIGS. 3A-3E there are shown isometric views of container dispenser 10. In FIG. 3A, tote 14 is moved in the direction of arrow 40 into position below dispenser 18. In FIG. 3B, container 16 is dispensed in the direction of arrow 42 into tote 14. In FIG. 3C, dispense module 18 is indexed in the direction of arrow 44 to the middle of tote 14 and container 16 dispensed 42. In FIG. 3D, dispense module 18 is indexed along arrow 44 to the right side of tote 14 and container 16 dispensed 42. In FIG. 3E, tote 14 now filled with 3 containers is removed in the direction of arrow 46 from module 10.

Figure 4:
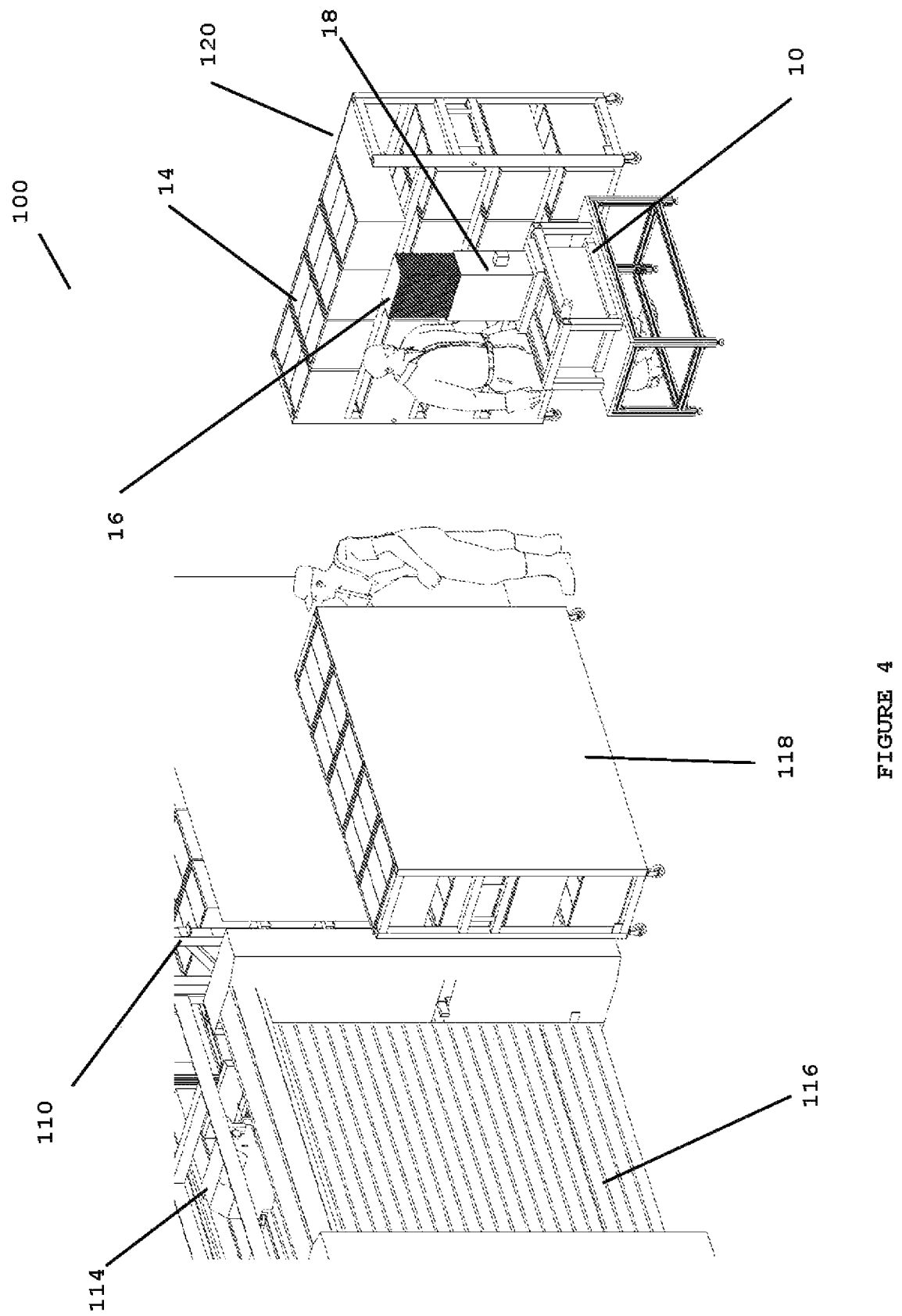
FIG. 4 is perspective view of a system including portable racks for transporting totes between storage locations and a container dispenser according to embodiments of the present technology.

Referring now to FIG. 4, there is shown system 100 having manual container dispense or bagger 10 with an alpharack or moveable racks 118, 120. The systems disclosed herein may be used in conjunction with different elements of racking systems, for example as disclosed in U.S. Patent Publication No. 2021/0323769 A1 published Oct. 21, 2021 entitled Transport Rack Cartridge (TRC) having a filing date Apr. 21, 2020 and U.S. Pat. No. 10,919,701 granted Feb. 16, 2021 and entitled "Interchangeable Automated Mobile Robots with a Plurality of Operating Modes Configuring a Plurality of Different Robot Task/ Capabilities" all of which are incorporated by reference herein in their entirety. Further, an interface 116 may be provided, for example, as described in U.S. Patent Publication No. 2022/0219904 A1 published Jul. 14, 2022 entitled "Transport Rack and Transport Rack Docking Interface" which is incorporated by reference herein in its entirety. Racks 118, 120 are shown on casters moveable from storage 110 to container dispense module 10. Docking interface 116 is provided to dock racking 118, 120 to storage 110 of the ASRS where Bots 114 may remove totes 14 loaded with containers 16 and replace them with empty totes. Rack 120 is shown positioned at container dispense 10 where a worker can remove empty totes and slide them into container dispense 10 for loading of containers 16 via dispense module 18.

Figure 5:
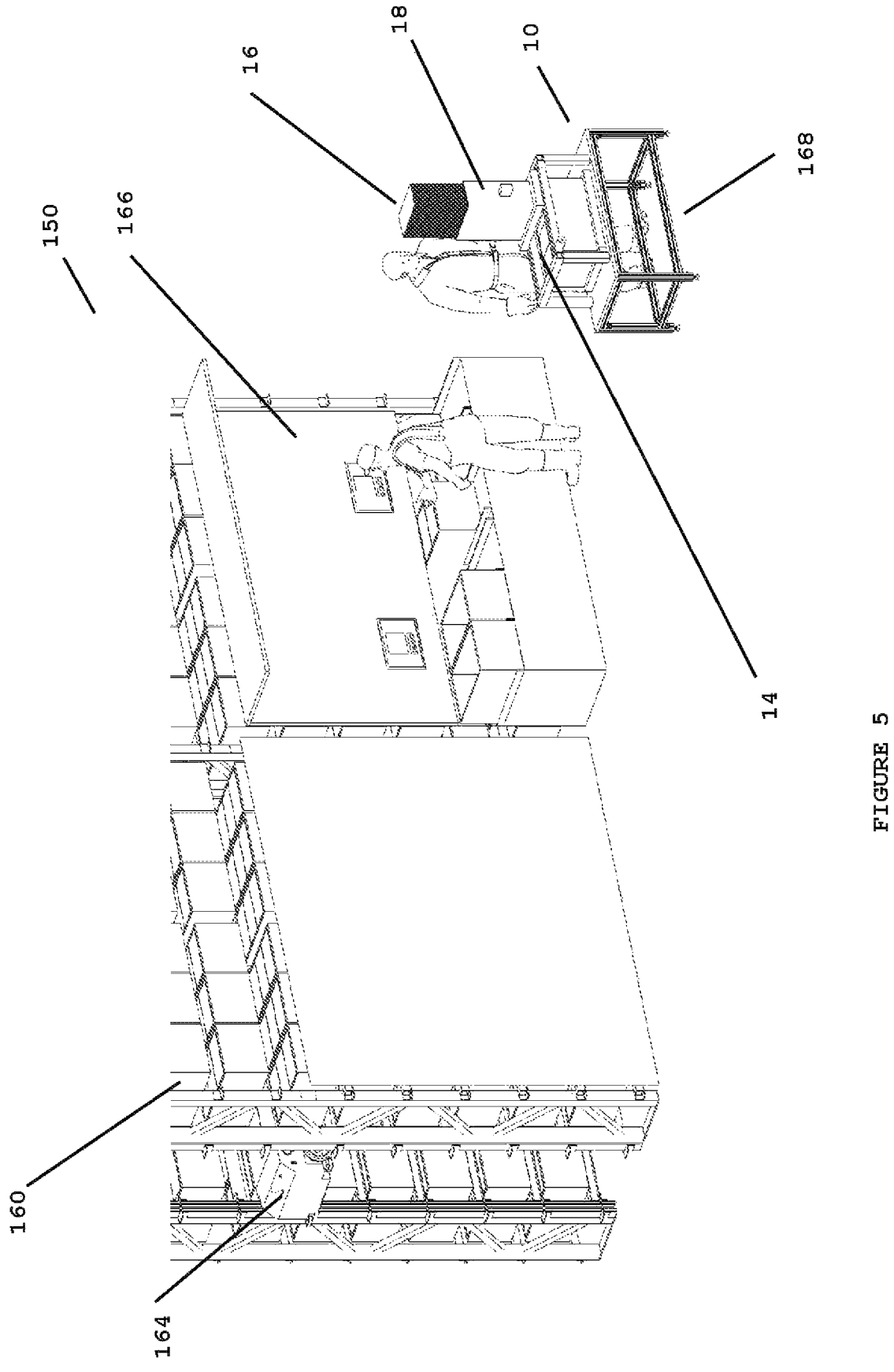
FIG. 5 is perspective view of a system where totes are transported between an interface to storage locations and a container dispenser according to embodiments of the present technology.

Referring now to FIG. 5 there is shown system 150 having manual container dispense or bagger 10 with a static workstation 168. Static workstation 168, also referred to herein as an interface, may have features as disclosed in U.S. Patent Publication No. U52020/0223630 with publication date Jul. 16, 2020 entitled "system having workstation with tote retention and release mechanism" which is incorporated by reference herein in its entirety. Static workstation 168 is provided to safely remove totes 14 from storage 160 of the ASRS where Bots 164 load and unload totes to/from static workstation 168. Totes 14 are removed from the ASRS via static workstation 168 and positioned at container dispense 10 where a worker can remove empty totes and slide them into container dispense 10 for loading of containers 16 via dispense module 18.

Figure 6:
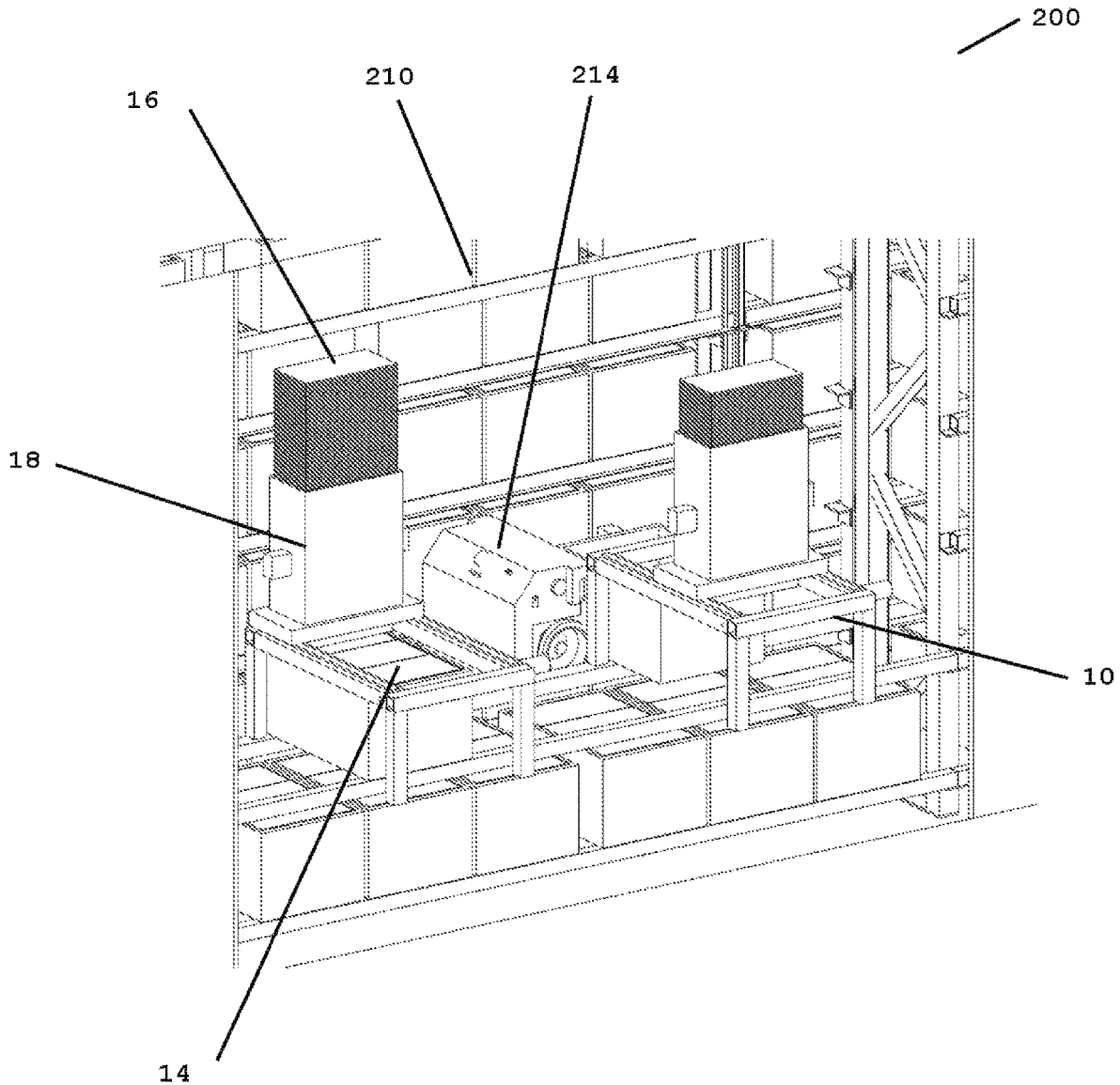
FIGS. 6-12 are views of a system where a container dispenser is integrated into a storge area of a fulfillment center, or integrated into other portions of the fulfillment center according to embodiments of the present technology.

Referring now to FIG. 6 there is shown system 200 having automatic container dispense or bagger 10 integrated into storage 210 of an ASRS. Here, Bots 214 move totes 14 from storage 210 to container dispense or bagger 10 integrated into storage 210 for loading of containers 16 via dispense module 18.

Figure 7:
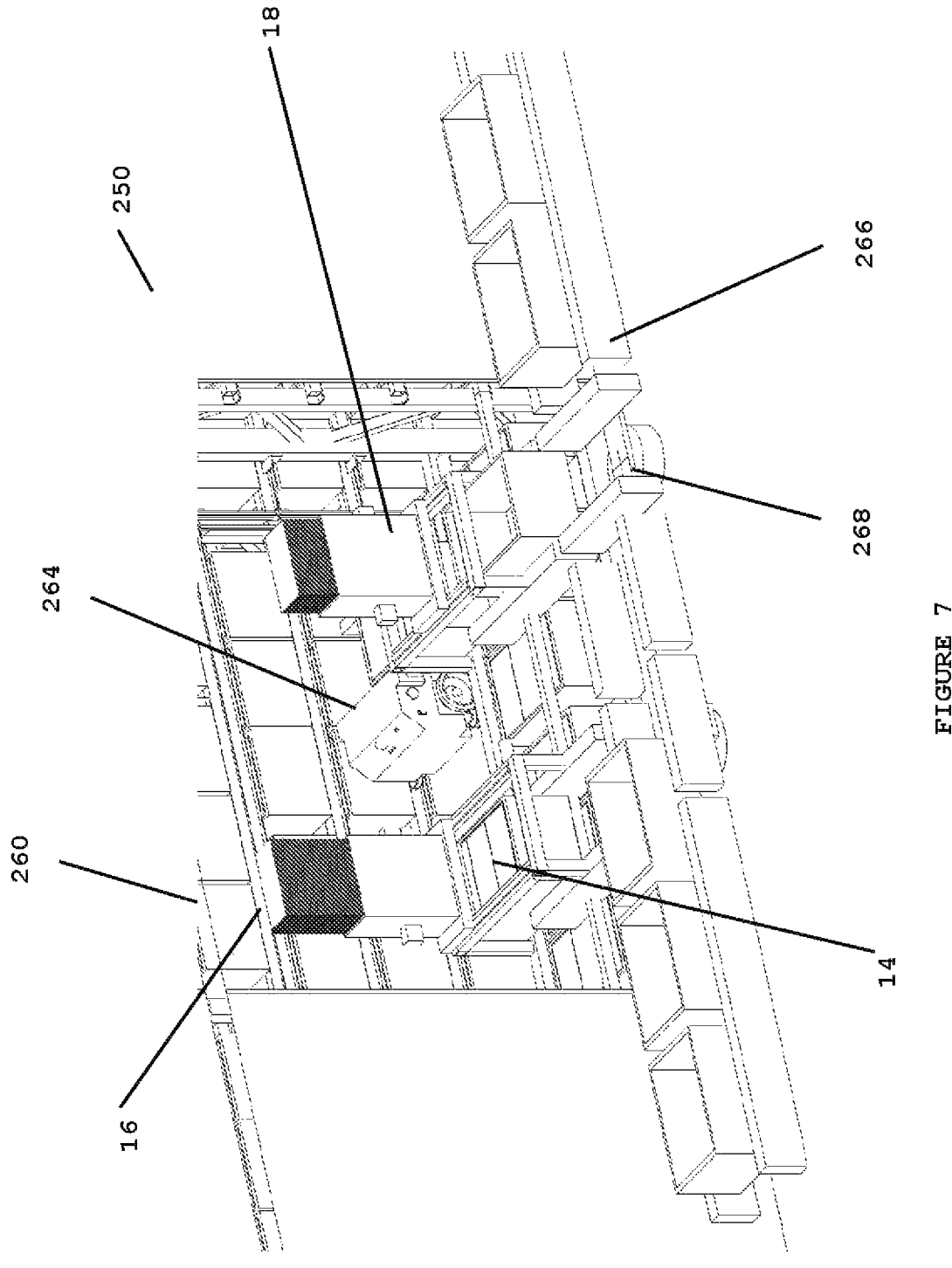

Referring now to FIG. 7 there is shown system 250 having automatic container dispense or bagger 10 integrated into storage 210 of an ASRS with conveyor 266. Conveyor 266 is shown on the outside of storage 260 where conveyor 266 has rotary indexer 268 that indexes 90 degrees and inserts totes 14 into dispense module 10/18 where Bots 264 can remove or replace the tote 14 in dispense module 10/18. Conveyor 266 in combination with Bot 264 may be used to induct or remove totes from storage 260 in this instance.

Figure 8:
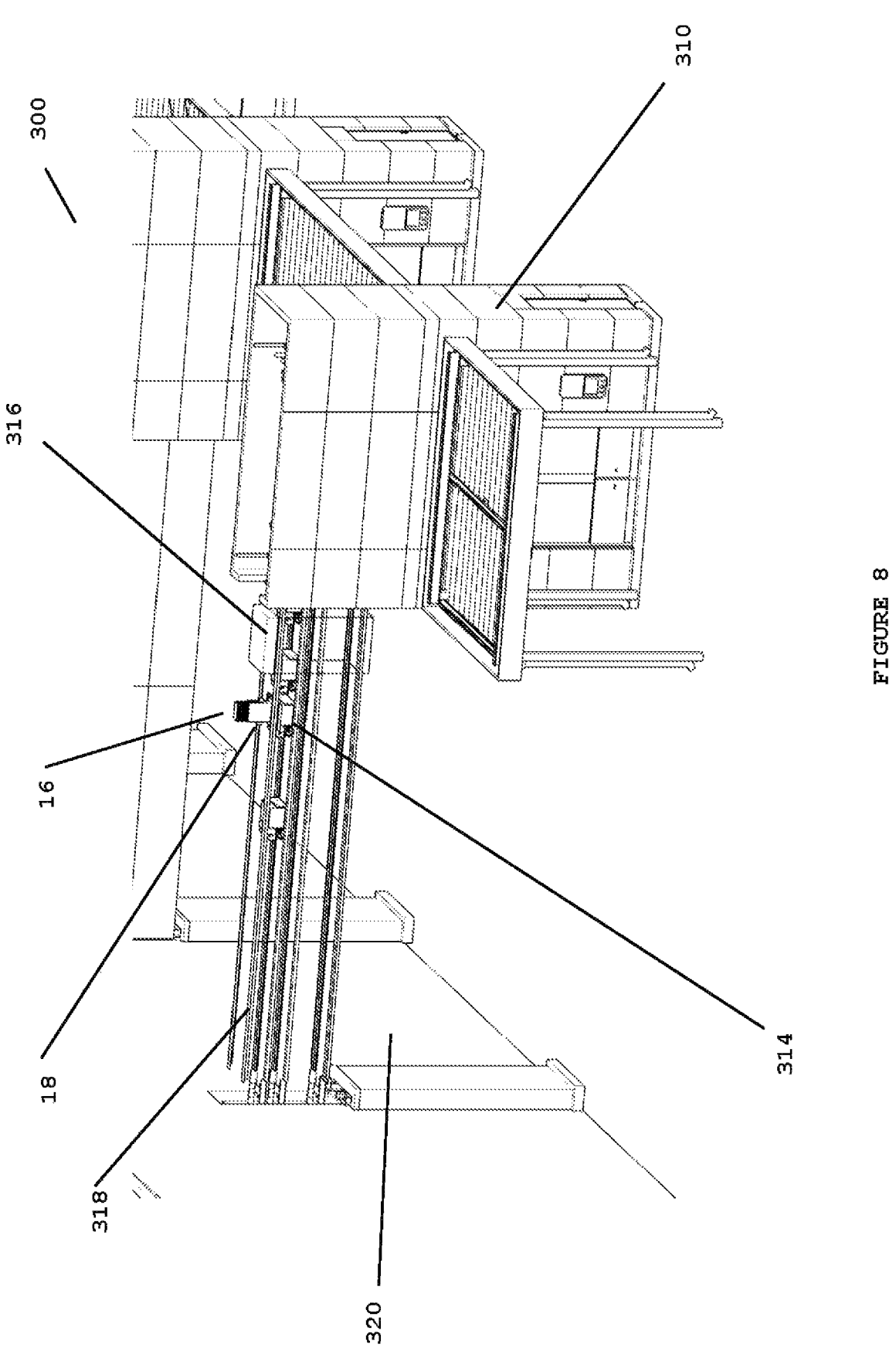

Referring now to FIG. 8 there is shown system 300 having automatic container dispense or bagger 10 integrated into an overhead transport rail 318 of an ASRS with automatic tote content dispense 310. Tote content dispense 310 may have features as disclosed in U.S. Provisional Patent Application No. 63/127,762 entitled "Micro-Fulfillment Center With Automated Dispense And Return Using Mobile Robots And Method Of Operating Same" having a file date of Dec. 18, 2020 which is incorporated by reference herein in its entirety. Bots 314 returning to facility 320 having the ASRS on rails 318 from Tote content dispense 310 with empty totes may go to conditioning station 316 to re-condition the tote (dis-infect, clean or otherwise condition) and then to dispenser 10/18 to have containers 16 dispensed into the empty tote such that tote 14 may now be re-used for a new order.

Figure 9:
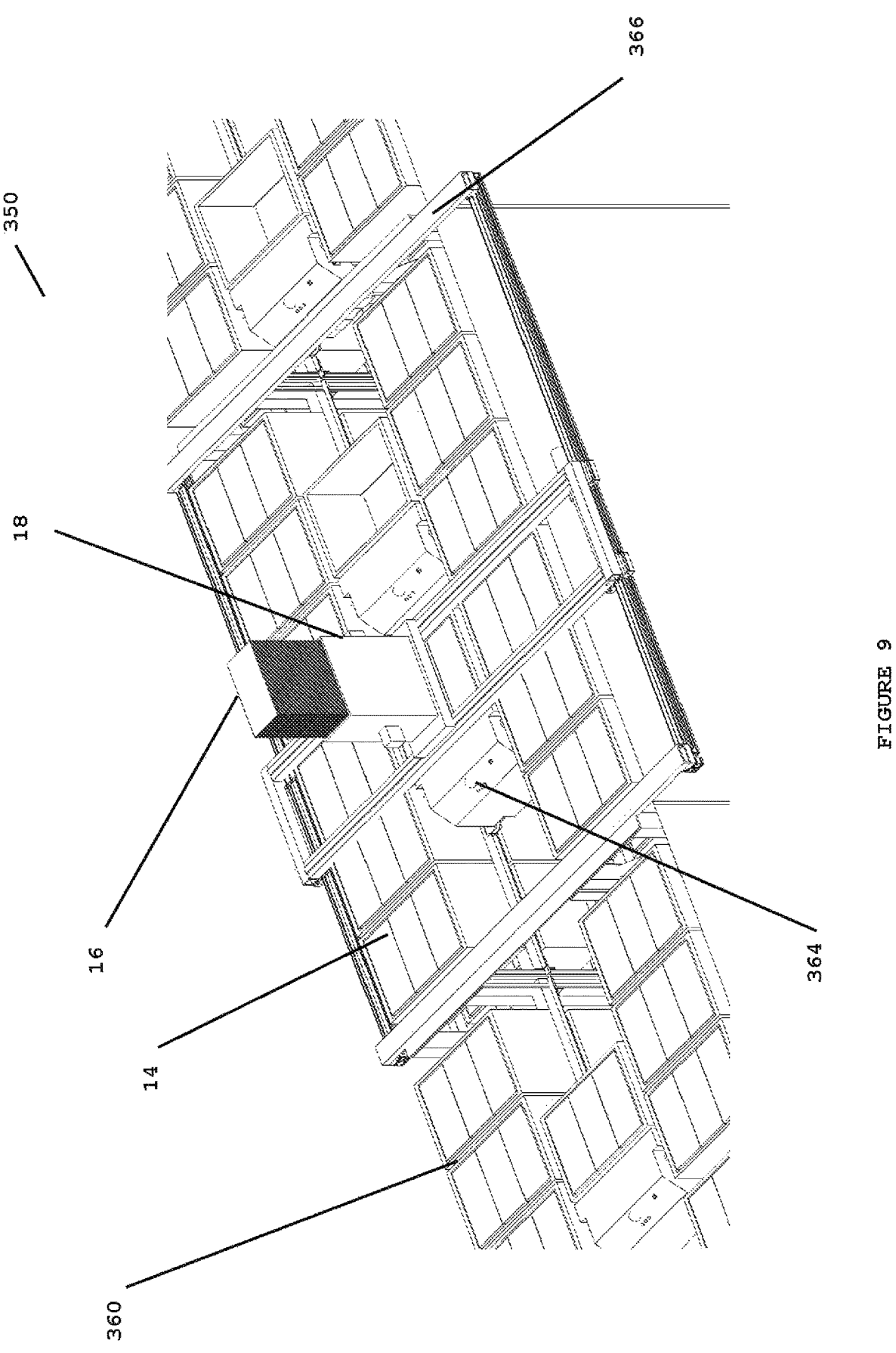

Referring now to FIG. 9 there is shown system 350 having automatic container dispense or bagger 10 integrated into storage 360 of an ASRS with gantry 366. Gantry 366 may have features as disclosed in U.S. Patent Publication No. 2020/0156871 entitled "System Having Robotic Workstation" having publication date of May 21, 2020 or U.S. Patent Publication No. US2021/039882A1 entitled "Universal Gripper For Tote And Sub-Tote Transport" having publication date Feb. 11, 2021, both of which are incorporated by reference herein in their entirety. Container dispense 18 is shown on gantry 366 moveable in 2 dimensions above bot 364 and storage 360. Here, container dispense 18 may deposit containers 16 into empty totes 14 in storage 360 or on the bot 364 within gantry 366 workspace.

Figure 10:
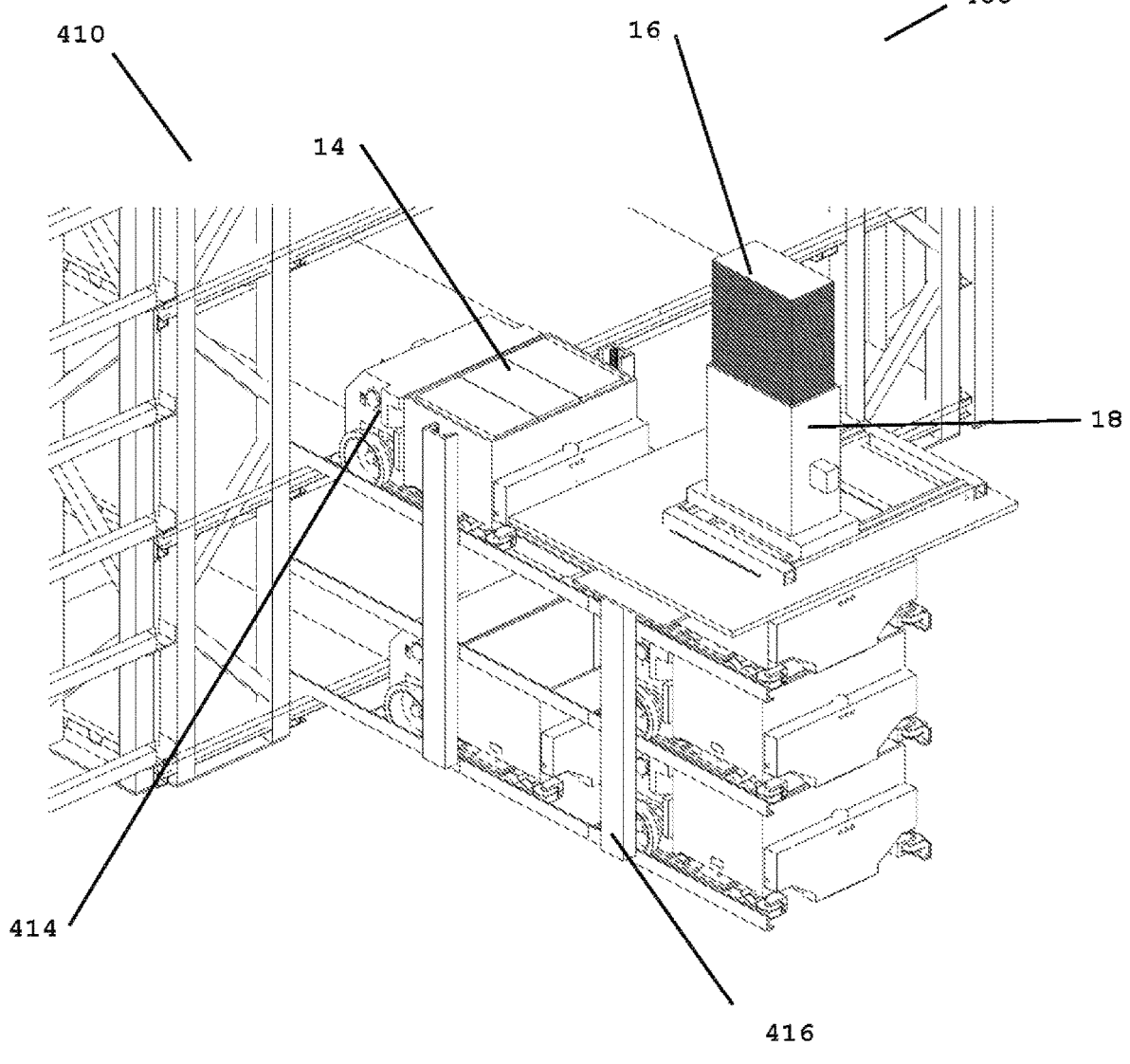

Referring now to FIG. 10, there is shown system 400 having container dispense 10 integrated into storage 410. Workstation 416 is shown having Bot entry and exits on different levels where container dispense 10/18 is provided to dispense containers 16 into totes 14 on Bots 414 where Bots 414 may circulate through workstation 416 from a first entry level, then climbing up or down and then to a second exit level. As shown, the container dispense or bagger 10 is configured to load containers into a tote at the top level of the workstation 416, but the container dispense or bagger 10 may be used to load containers into totes at other levels of the workstation 416 in further embodiments.

Figure 11:
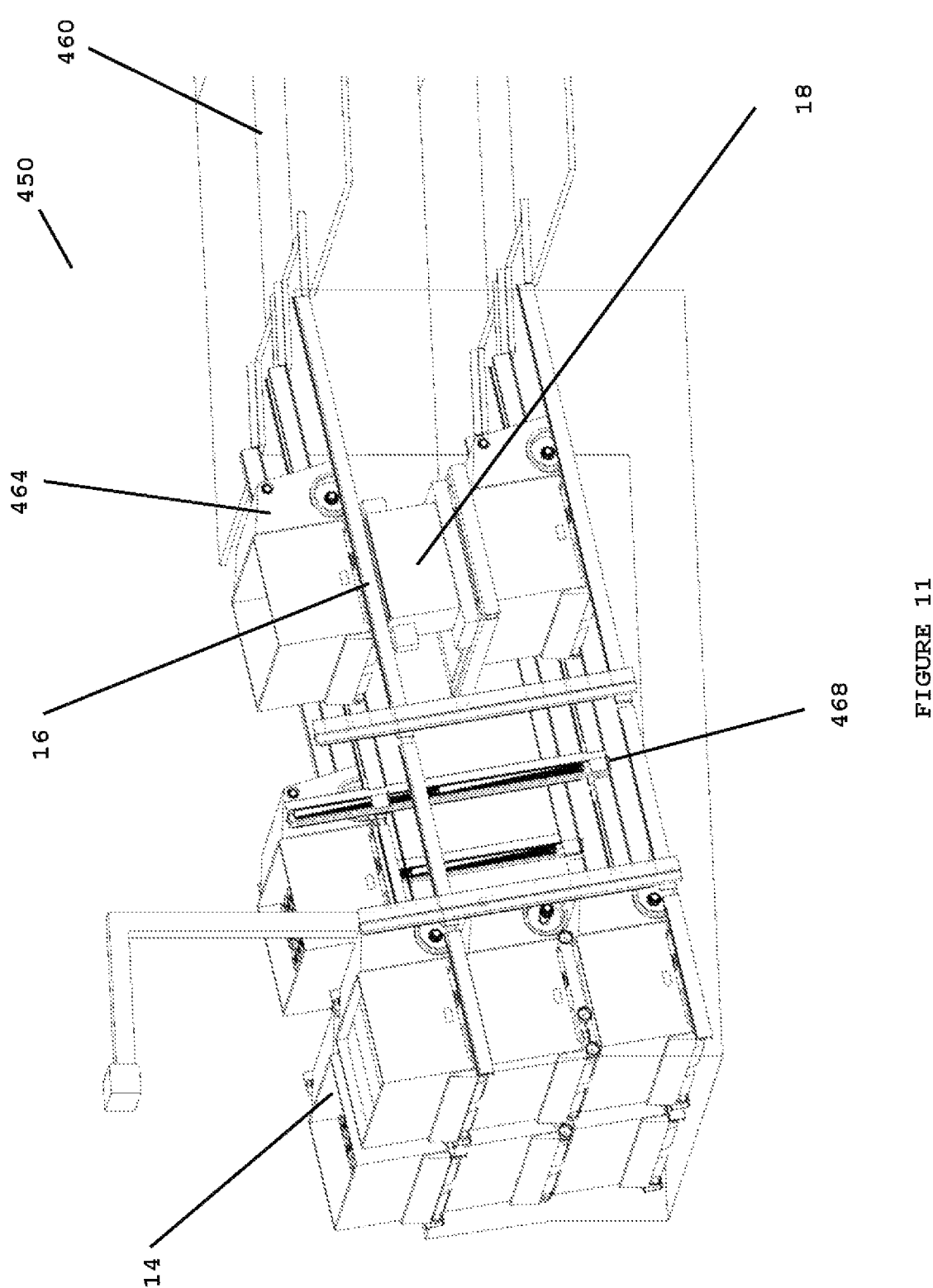

Referring now to FIG. 11, there is shown system 450 having container dispense 10 integrated into dynamic workstation 468. Picking dynamic workstation 468 is shown where contents are picked from product totes and placed in order totes having containers 16 therein. Incoming order totes on Bots 464 stop at container dispense module 10/18 to have containers dispensed therein. Picking dynamic workstation 468 is shown having Bot entry and exits on different levels of decks 460 where container dispense 10/18 is provided to dispense containers 16 into totes 14 on Bots 464 where Bots 464 may circulate through workstation 468 from a first entry level, then climbing up to a second picking and exit level.

Figure 12:
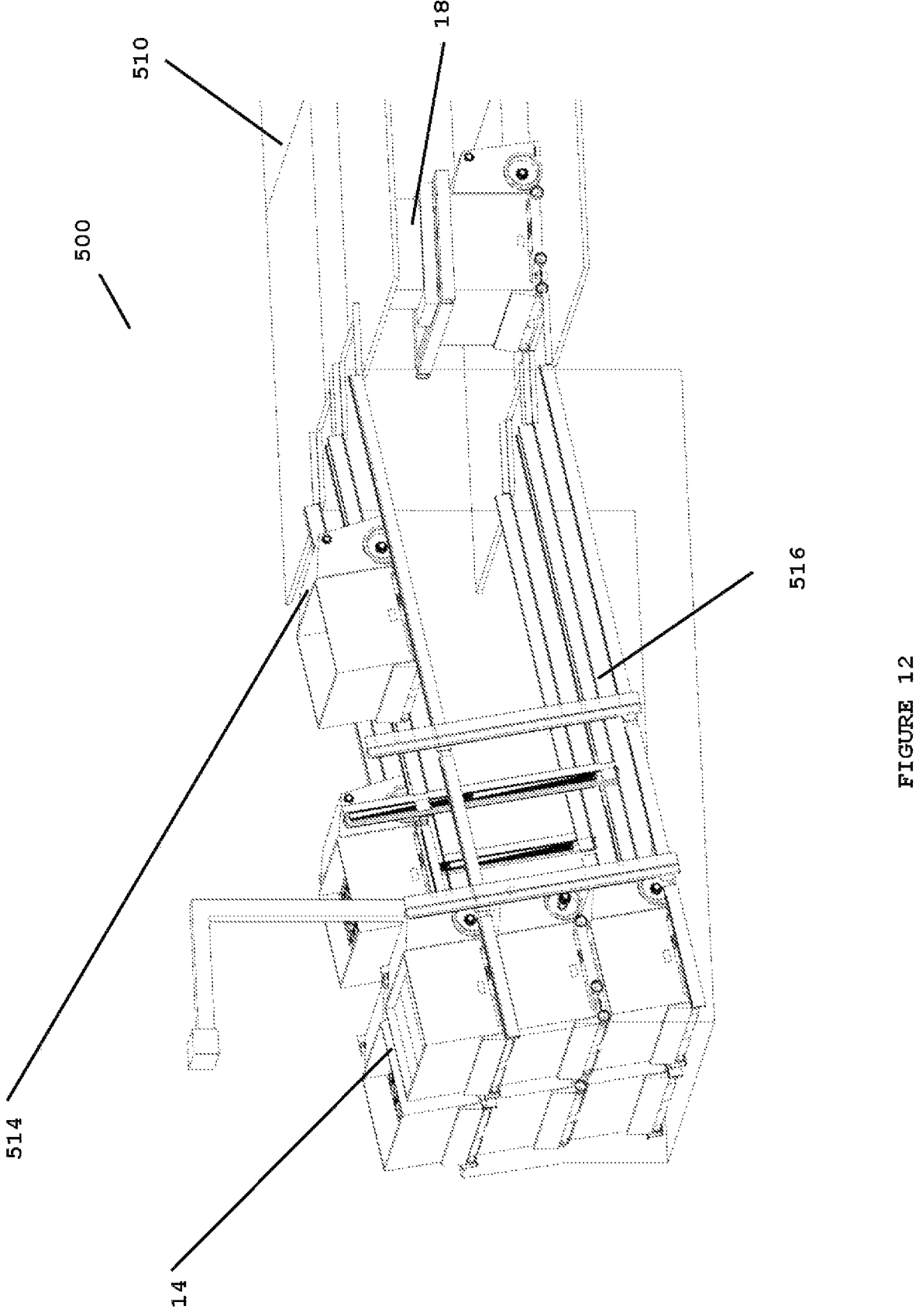

Referring now to FIG. 12, there is shown system 500 having container dispense 10 integrated into decking 510. Picking dynamic workstation 516 is shown where contents are picked from product totes and placed in order totes having containers 16 therein. Incoming order totes on Bots 514 stop at container dispense module 10/18, supported on the lower deck 510, to have containers dispensed therein. Picking dynamic workstation 516 is shown having Bot entry and exits on different levels of decks 510 where container dispense 10/18 is provided to dispense containers 16 into totes 14 on Bots 514 where Bots 514 may circulate through workstation 516 from a first entry level, then climbing up to a second picking and exit level.

Referring now to FIG. 13, there is shown process flow diagram 550 showing an exemplary process an order tote with containers goes through. Order Totes are removed from storage 560 and transported to a container dispense module in step 562. Containers are dispensed 564 in the order tote and the tote then transported 566 to a picking workstation. The order is picked 568 at the workstation and the order tote is then transported to storage 570. When the order is ready for pickup by a customer the order tote is transported to an order dispense module in step 572 and the order dispensed 574. The now empty order tote is transported to a conditioning station 576 and reconditioned 578. Data 580 associated with reconditioning is stored and the now conditioned order tote transported 582 back to storage awaiting the next order to which it will be assigned.

Figure 14:
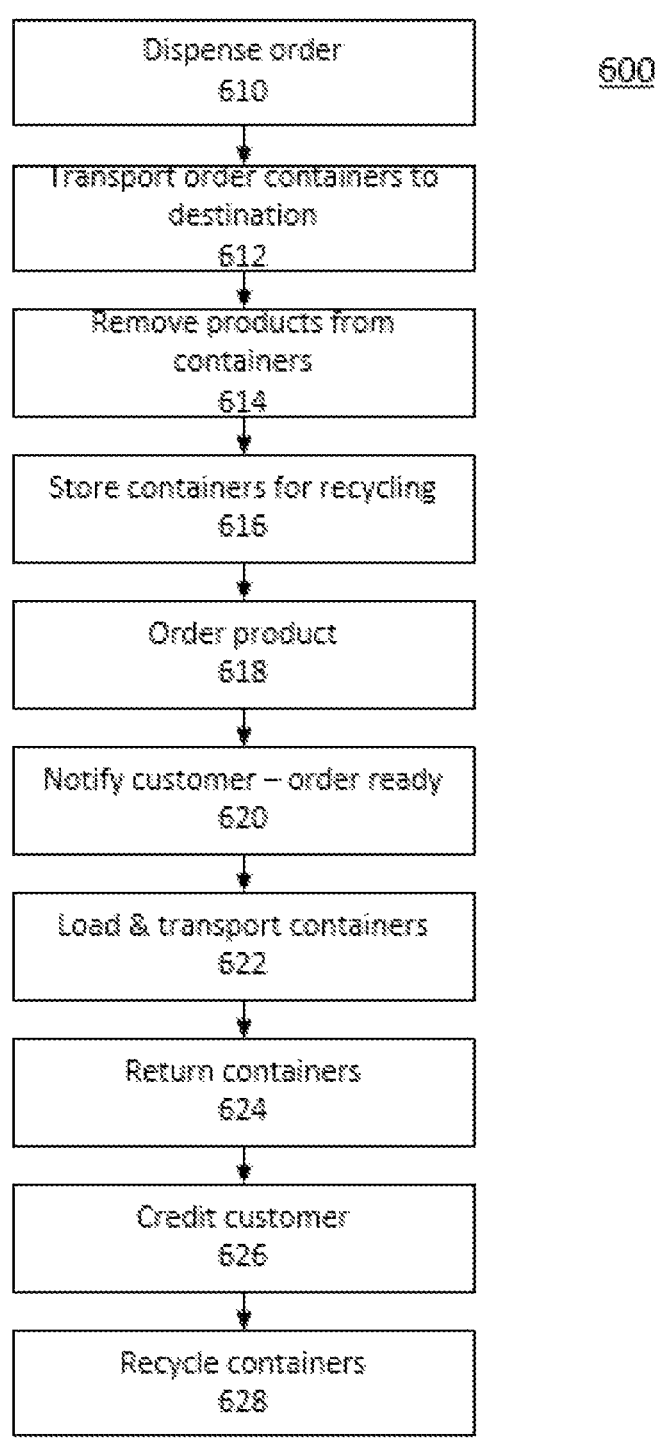

Referring now to FIG. 14, there is shown process flow diagram 600 showing how containers may be recycled. At order dispense step 610 containers are removed from an order tote by and associate or customer. The containers are then transported 612 with product to the customer home or otherwise and the contents removed 614. The containers may be stored 616 until the next order is placed 618 and fulfilled 616 when the order is ready for pickup. The customer transports the containers back to the original pickup site 622 and returns the containers 624 for a credit 626 where the containers may then be recycled 628.

Referring now to FIG. 15, there is shown process flow diagram 650 where data 660 associated with a given order may be tracked throughout the fulfillment process. Data tracked may include chain of custody data tracking where a given order travelled and/or was stored and/or which associate and/or tote order dispense module was used. Data tracked may include environmental data such as temperature and humidity over time. Attribute data may include contents, expiration dates or any suitable data. Initially the order tote containers are identified 662 along with a corresponding customer order. The containers may be marked with unique identifiers 664 and dispensed in the corresponding order tote 666 (marking module may be integrated into system 10). The product to be picked is identified 668 and the order picked 670 where the tote is then transported back to storage 672. When the order is ready, the tote is transported 674 to dispense, the order dispensed 676. The now empty tote is then transported to a conditioning station 678, re-conditioned 680, the data stored 682 and the tote transported 684 back for re-use.

Referring now to FIG. 16, there is shown process flow diagram 700 for off-line dispense. Totes are removed 710 from storage and transported to a static workstation 712 for removal 714 from the ASRS. Containers are then dispensed 716 into the order totes and the totes re-inducted 718 back into the ASRS. The tote now having containers is transported to the picking workstation 720, the order picked 724 and the tote transported back to storage 726. When the order is ready, the tote is transported 728 to dispense, the order dispensed 730. The now empty tote is then transported to a conditioning station and re-conditioned 732, and the tote transported 724 back to storage for re-use.

Figure 17:
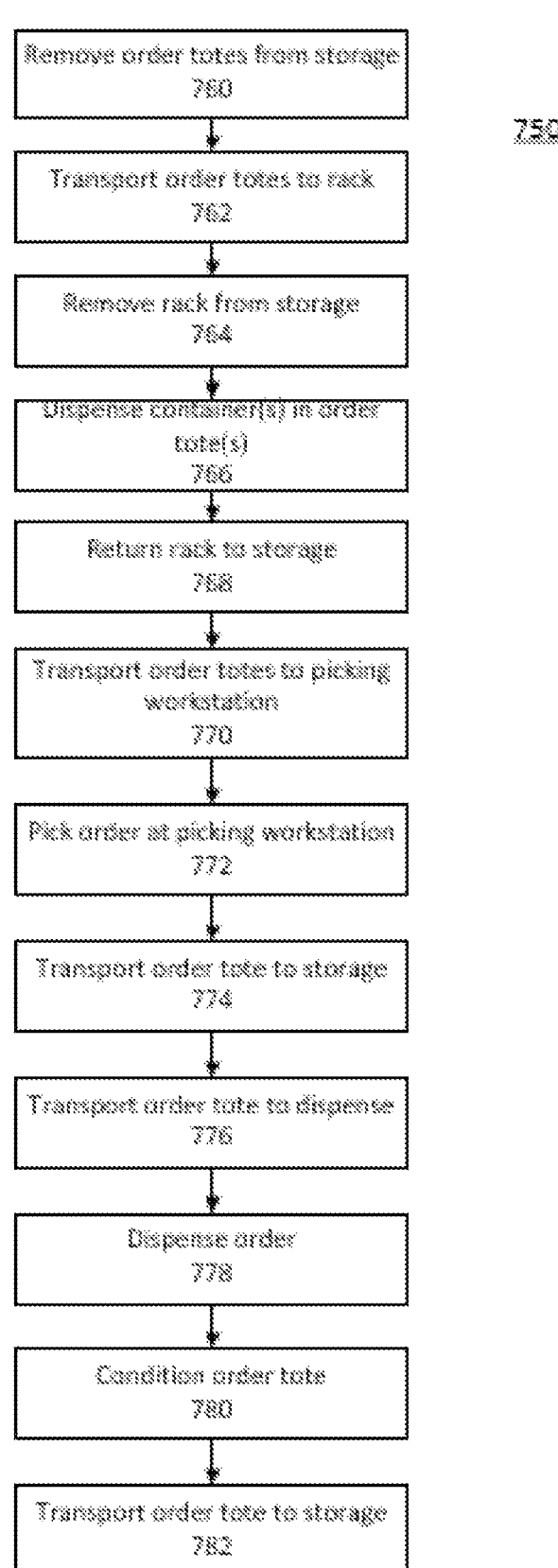

Referring now to FIG. 17, there is shown process flow diagram 750 for loading totes using container dispense module 10 and a rack 118, 120. Totes are removed 760 from storage and transported to a rack 762 for removal 764 as a group on the rack from the ASRS. Containers are then dispensed 766 into the order totes and the rack re-coupled 768 back to the ASRS. The tote now having containers is transported to the picking workstation 770, the order picked 772 and the tote transported back to storage 774. When the order is ready, the tote is transported 776 to dispense, and the order dispensed 778. The now empty tote is then transported to a conditioning station and re-conditioned 780, and the tote transported 782 back to storage for re-use.

Figure 18:
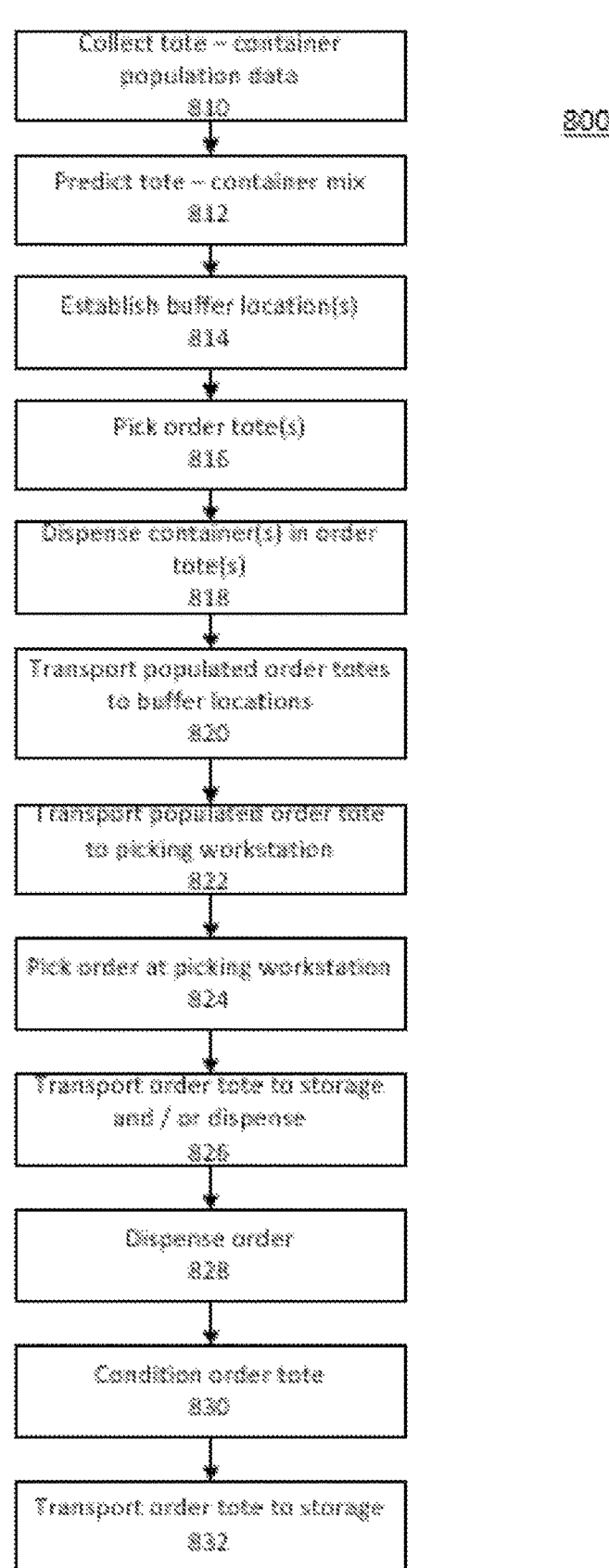

Referring now to FIG. 18, there is shown process flow diagram 800 for predictive container to tote population. Container/tote population data as collected 810 and analyzed to predict tote-container mix 812 over a given time period. Population data may include number of order totes needed for a given time period, types and numbers of containers per tote (i.e., Container Mix), environmental data like mix of ambient, chilled and frozen totes or any suitable data. A buffer location 814 is established 814 based on the predicted tote and container mix, order totes picked 816 and containers dispensed 818. The order totes are provided to populate the buffer 820 awaiting orders. The tote now having containers is transported to the picking workstation 822, the order picked 824 and the tote transported back to storage 826 or dispense. When the order is ready, the tote is transported to dispense, and the order dispensed 828. The now empty tote is then transported to a conditioning station and re-conditioned 830, and the tote transported 832 back to storage for re-use.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated.

What is claimed is:

1. A container dispenser for dispensing one or more containers into a tote within an automation-based order fulfillment system, the container dispenser comprising:
   a dispense module configured to hold the one or more containers, and configured to dispense the one or more containers into the tote;
   a table configured to index the dispense module to enable the dispense module to dispense the one or more containers at different positions within the tote; and
   a structure configured to support the table and dispense module over the tote.

2. The container dispenser of claim 1, wherein the dispense module comprises an actuator configured to dispense the one or more containers into the tote one at a time.

3. The container dispenser of claim 1, further comprising a through beam sensor configured to detect proper seating of the one or more containers within the tote.

4. The container dispenser of claim 1, further comprising a camera configured to detect proper placement of the one or more containers into the tote or proper removal of the one or more containers from the tote.

5. The container dispenser of claim 1, wherein the container dispenser is integrated into a storage location of the automation-based order fulfillment system for storing the tote.

6. The container dispenser of claim 1, wherein the container dispenser is integrated into a workstation of the automation-based order fulfillment system, goods being transferred into the one or more containers at the workstation to fulfill orders for the goods.

7. The container dispenser of claim 1, wherein the container dispenser is integrated into a deck of the automation-based order fulfillment system.

8. The container dispenser of claim 1, wherein the container dispenser is integrated into a gantry configured to dispense the one or more containers into any of a plurality of totes accessible by the gantry.

9. An automation-based order fulfillment system comprising:
   a storage area comprising storage locations configured to store a plurality of totes;
   an interface adjacent a portion of the storage area comprising a portal through which totes of the plurality of totes may be transferred;
   mobile robots configured to obtain the totes from storage and position the totes at the interface; and
   a container dispenser configured to dispense one or more containers into the totes received from the interface, the container dispenser comprising:
      a dispense module configured to hold the one or more containers, and configured to dispense the one or more containers into the totes, and
      a table configured to index the dispense module to enable the dispense module to dispense the one or more containers at different positions within the tote.

10. The automation-based order fulfillment system of claim 9, wherein the dispense module comprises an actuator configured to dispense the one or more containers into a tote of the plurality of totes one at a time as the table indexes across an opening of the tote.

11. The automation-based order fulfillment system of claim 9, further comprising a static workstation, wherein an empty tote is obtained from the interface, and filled with containers by the dispense module at the static workstation.

12. The automation-based order fulfillment system of claim 11, where, after receiving the container at the static workstation, the totes are then returned to the interface.

13. The automation-based order fulfillment system of claim 9, further comprising a portable rack configured to dock with the interface.

14. The automation-based order fulfillment system of claim 13, wherein the mobile robots comprise a first transport mechanism configured to present the totes through the interface into the portable rack.

15. The automation-based order fulfillment system of claim 13, wherein the portable rack includes a second transport mechanism configured to extend through the interface to obtain the totes from the mobile robots.

16. The automation-based order fulfillment system of claim 13, wherein an empty tote is obtained from the portable rack, filled with containers by the dispense module and then returned to the portable rack.

17. An automation-based order fulfillment system comprising:

a storage area comprising storage locations configured to store a plurality of totes;

mobile robots configured to transfer totes to and from the storage locations of the storage area; and a container dispenser configured to receive totes from the mobile robots, and configured to transfer one or more containers into the totes received from the mobile robots, the container dispenser comprising:

a dispense module configured to hold the one or more containers, and configured to dispense the one or more containers into the totes, and a table configured to index the dispense module to enable the dispense module to dispense the one or more containers at different positions within the tote.

18. The automation-based order fulfillment system of claim 17, further comprising an aisle within which the mobile robots are configured to travel, the storage locations being adjacent to a first side of the aisle, and the container dispenser being adjacent to a second side of the aisle.

19. The automation-based order fulfillment system of claim 18, wherein a mobile robot of the mobile robots obtains a tote from a storage location of the storage locations, moves along the aisle and transfers the tote to the container dispenser to receive the one or more containers.

20. The automation-based order fulfillment system of claim 18, wherein the container dispenser receives a tote, transfers the one or more containers into the tote, and then a mobile robot of the mobile robots moves along the aisle to transfer the tote to a storage location of the storage locations.

21. The automation-based order fulfillment system of claim 20, further comprising a conveyor configured to transfer empty totes to the container dispenser.

22. The automation-based order fulfillment system of claim 17, further comprising a workstation, the container dispenser integrated into the workstation, the mobile robot configured to transfer the totes from the storage locations to the workstation.

23. The automation-based order fulfillment system of claim 17, wherein the one or more containers are transferred into the totes at the workstation, and goods are transferred into the one or more containers to fulfill orders at the workstation.

24. A method of fulfilling orders in an automation-based order fulfillment system, comprising:

(a) positioning an order tote for fulfilling one or more orders at a container dispenser, the container dispenser comprising containers configured to be dispensed into the order tote;

(b) dispensing one or more containers into the order tote; and (c) transporting the order tote to a workstation where goods are placed into the one or more containers in the tote to fulfill one or more orders.

25. The method of claim 24, further comprising the step of indexing at least a portion of the container dispenser across an opening of the order tote to dispense multiple containers at different positions within the order tote.

\* \* \* \* \*